Jan. 13, 1959 K. L. WESTLIN 2,868,320
COMBINED CYCLONE AND BAG TYPE FILTER
Filed Dec. 9, 1955 2 Sheets-Sheet 1
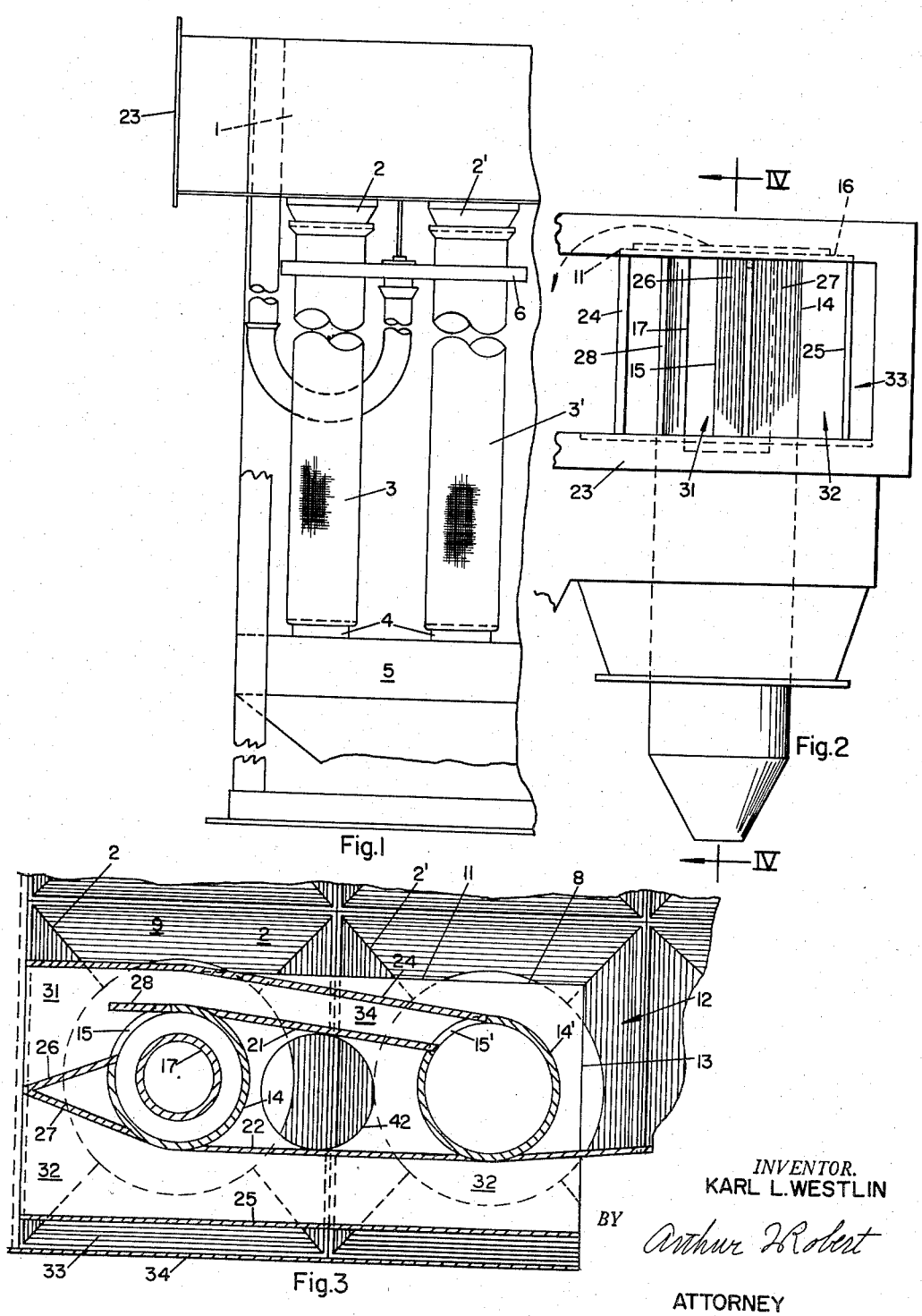
INVENTOR.
KARL L. WESTLIN
BY
ATTORNEY

2,868,320
COMBINED CYCLONE AND BAG TYPE FILTER

Karl L. Westlin, Louisville, Ky., assignor to American Air Filter Company, Inc., Louisville, Ky., a corporation of Delaware Application December 9, 1955, Serial No. 552,187

5 Claims. (Cl. 183—34)

The present invention relates to dust separators of the cyclone type, and relates in particular to an improved structure which enables the conjoint use of a cyclone type dust separator with a bag or sleeve type dust collector or filter discharging into a common dust hopper.

Bag type dust collectors have been proposed for the collection of sugar dust produced in sugar pulverizing mills. To reduce the load on the bag type filter it has been proposed to pass the dust laden air through a cyclone separator in advance of the bag filter. This, however, requires separate dust hoppers for the cyclone and bag separators. The cyclone type separator separates largely the coarser dust, and the bag type filter separates out the finer dust with residual coarser dust. As the sugar dust is the desired end product, separation accomplished in such apparatus produces two grades of powder which must be intimately mixed to produce the desired pulverized sugar end product.

It is an object of the present invention to provide a cyclone type dust separator in which the static pressure at the dust hopper may be made substantially equal to the static pressure at the cleaned gas outlet.

A further object is the provision of a combined cyclone type dust separator and bag type filter in which the dust is collected in a common dust hopper.

The present invention is based upon my discovery that a cyclone type dust separator can be designed to provide a static pressure at the dust discharge end of practically any desired value. Thus, I can adjust the static pressure in the dust discharge end which connects with the dust hopper or bin, so that it is equal to or less than the surrounding pressure. Thus, when a cyclone type dust collector is combined with a bag type dust collector to discharge dust into a common bin, the pressure in the bin can be maintained at or below the outlet pressure of the cyclone, so that dust falling through the bag is not blown back. This arrangement permits the use of a common bin so that the dust from the two types of separators is automatically commingled.

In utilizing this discovery, I insert a cyclone type dust separator within a bag type filter or separator, arranged so the dust from the two separators discharges into a common dust hopper or bin. In this arrangement, air first passes through the cyclone dust separator, and the cleaned air discharges at the top of the cyclone separator, and then passes down through the bag filter. Thus the dust from both separators discharges at the bottom into a common bin.

The conventional type of cyclone dust separator comprises a cylindrical chamber having a tangential air inlet, and terminating at the bottom in an open conical end, with the dust hopper below the conical end. As ordinarily employed part of the whirling gas flows through the open conical end or baffle into the hopper, reverses direction in the hopper, and flows up through the open conical end to the air discharge outlet. I have found that by extending a tubular conduit below the open conical end to substantially the dust hopper, and adjusting the location of an open conical baffle along this tube, the desired static pressure can be produced at the end of the tube where it enters the hopper. Thus, in employing such a cyclone separator in a bag type filter, the tube can discharge dust at the bottom of the bag without producing any counter flow of air in the bag, which would interfere with the settling of dust in the bag.

The invention is described in detail in the following specification taken in connection with the accompanying drawing illustrating a preferred embodiment of the invention by way of example, and wherein:

Figure 1 is a fragmentary elevational view of a dust separator embodying the invention;

Figure 2 is a side view of the upper portion of Figure 1 as viewed from the left;

Figure 3 is a plan view of Figure 1 with the top cover removed; and

Figure 4:
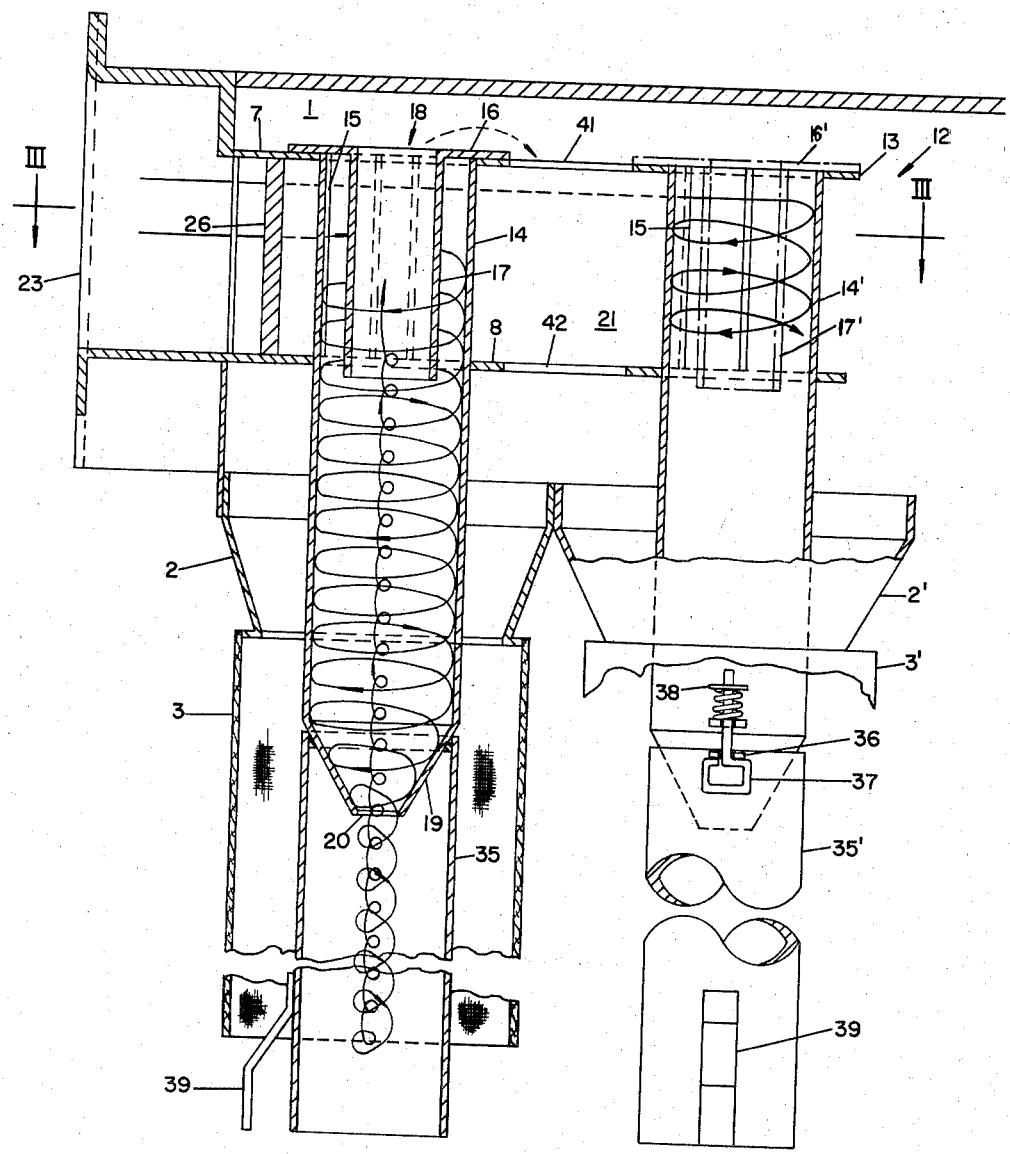
Figure 4 is a vertical sectional view corresponding to one taken along line IV—IV of Figure 2.

Referring to the drawing, Figure 1, there is shown a portion of a tubular stocking type filter of conventional construction comprising an inlet plenum chamber 1 for gas to be cleaned, in the bottom of which are a plurality of inverted pyramidal connector members or adaptors 2, 2', each respectively supporting a cloth tubular sleeve or stocking 3, 3'. Each of the tubular sleeves are connected at the bottom through a suitable connecting member 4 to a dust collecting hopper 5. Air to be cleaned enters the plenum inlet chamber 1, and flows down through the stockings and through the porous walls thereof, depositing the dust carried thereby on the interior wall of the stockings. At intervals, a blow ring 6, connected to a secondary air supply traverses the stockings, vertically, and blows air against the stockings as it traverses them, to dislodge the dust, deposited on the stocking walls, which falls into the hopper. The structure so far described is illustrated and described in greater detail in the application for patent of Stig. G. Sylvan, Serial No. 363,322, filed June 22, 1953, patent #2,751,042, issued June 9, 1956, for Mechanical Dry Tubular-Stocking Dust Collector, etc.

Referring to Figure 4, the inlet plenum chamber 1 has a top horizontal partition 7 and a similar lower partition 8 suitably welded to the walls of the plenum chamber. Referring to Figures 2 and 3, it will be noted that the plates 7 and 8 do not extend over the complete area of the plenum chamber, but provides a space 9 beyond the edge 11, and a space 12 beyond the edge 13.

A cylindrical cyclone housing 14 is welded in a suitable aperture in top plate 7, and this housing extends through a suitable aperture in lower plate 8 and through the adapter 2 into the filter sleeve or stocking 3. Part of the cyclone housing is cut away between the partitions 7, 8 to provide a gas inlet opening 15. A similar cyclone housing 14' having a similar inlet 15' is located in the adjacent adapter 2'. The plates 7 and 8 thus support the cyclone housings 14 and 14'. The top of housing 14 has a cover 16 from which depends a cylindrical outlet tube 17 suitably welded in the cover. The cover closes off the top of housing 14 and provides an outlet opening 18. At the bottom, housing 14 has a conical baffle 19 with an opening 20 therethrough. The housing 14' has a similar cover 16' and outlet tube 17' which provides an outlet opening 18'.

A pair of vertical partitions 21, 22 between horizontal partitions 7 and 8 are welded to the housings 14, 14'. Partition 22 extends substantially tangentially of the housing 14, 14', and partition 21 connects tangentially to housing 14 and extends to one edge of the inlet opening 15'. The plenum chamber 1 has an inlet connection 23

(Figs. 1 and 4). The space between partitions 7, 8 is further blocked off by a vertical partition 24 which extends from inlet 23 along the edges 11 of partitions 7 and 8 for a distance, then effects to an edge of inlet 15' so as to be tangential to the interior wall of chamber 14'. Another vertical partition 25 extends from the inlet 23 along the opposite edges of plates 7, 8. The diverging baffles 26, 27 between plates 7 and 8 extend from the inlet 23, baffle 27 being tangent to housing 14, and baffle 26 extending to an edge of cyclone inlet 15. Another vertical baffle 28 is attached to the opposite edge of cyclone inlet 15 substantially tangent to the inner surface of chamber 14. It will be seen that baffles 24 and 25, together with interposed baffles 26 and 27 at the left end of Fig. 3, divide the corresponding left end of the plenum chamber, between horizontal upper and lower partitions 7 and 8, into inlet passages 31 and 32. The inlet passage 31 connects immediately to cyclone inlet 15 and also connects to cyclone inlet 15' through passage 34, between baffles 24 on the one side and 28, 21 on the other. Baffle 27 serves mainly to prevent eddy currents. The inlet passage 32, between baffles 25 on the one side and 27, 22 on the other lead to the tangential inlets of another pair of similarly arranged cyclones, which are not illustrated.

A sleeve 35' is attached to the lower end of housing 14' in any suitable manner. As shown, this sleeve has a pair of diametrically opposed slotted brackets 36, and a spring pressed rod 37, mounted in each bracket 38 on housing 14'. The spring pressed rods 37 bias the slotted brackets upwardly and clamp the sleeve 35' to housing 14' with a suitable gasket interposed therebetween. A similar sleeve 35 is similarly clamped to the bottom of housing 14. At the bottom, these sleeves carry one or more spacers 39. The elevation of the bottom of the sleeves may vary but normally will be lower than that of the lower end of the filtering portion of the stockings.

From the description so far pursued, it will be seen that air to be cleaned is supplied from inlet 23, and part flows by passage 31 into cyclone chamber 14. The air whirls downwardly through chamber 14 along the wall thereof, reverses, and flows upwardly through the center, exiting by outlet tube 17 through outlet 18. The coarser dust is separated from the gas in the cyclone chamber and falls through opening 20 into the dust hopper 5. This cyclone operates in conventional manner. The gas that flows through passage 34 is similarly separated from dust in cyclone chamber 14', and the dust falls into the hopper 5.

It will be observed that the gas which flows out of opening 18, flows by spaces 9 and 12 into plenum chamber 1, and from there flows through adapter 2 into tubular filter sleeve 3. An additional avenue for flow of gas may be provided by the openings 41, 42 in plates 7 and 8 respectively, the flow being indicated by dotted arrows. The arrangement is such that gas to be cleaned first is treated in the cyclone separators, and then is discharged into plenum chamber 1, from which it flows through the filter sleeves 3, and out through the porous sleeves. Any desired number of bag filters may be connected between the plenum chamber and hopper, and each bag filter may contain a cyclone separator as herein described.

In a cyclone separator, as ordinarily constructed and operated, a substantial static pressure difference exists between the cleaned gas outlet, and the dust discharge outlet or hopper. That is, the static pressure at the dust discharge outlet 20 would be higher than the static pressure at the cleaned air outlet 18, and as a result, if such a separator were inserted in a bag filter 3 as shown, air would flow from the lower end of sleeve 35, or from the hopper, upwardly through sleeve 3, picking up dust and reducing the efficiency of separation in the sleeve and cylone separator. Disregarding the baffle 19, the pressure characteristics of a cyclone separator are such, that the combined length of housing 14 and sleeve 35 cannot, within practicable limits of size, produce a static pressure in the hopper that is lower than the static pressure at outlet 18. However, by positioning the baffle 19 a proper axial distance from the inlet 15, I am able to lower the static pressure in the hopper so that it is no greater than the static pressure in tube 3, and as a consequence, gas will not flow from the hopper upwardly in sleeve 3. In fact, a pressure in the hopper slightly lower than that in sleeve 3 may be desirable, and can be produced by proper positioning of baffle 19.

The proper axial position of baffle 19 depends on a number of factors, such as the diameter of the cyclone housing, and, therefore, its position should be experimentally determined. However, my discovery that the baffle can be positioned to produce a hopper pressure no greater than the cyclone outlet pressure, enables the cyclone separator to be employed inside of a sleeve filter so that separate dust receptacles for the dust from the cyclone separator and sleeve filter are not required. This invention is of advantage in the sugar pulverizing operation as it allows the cyclone separator to remove the bulk of the coarser dust with some of the finer dust, and deposit it in the same hopper that receives the residual dust from the sleeve filter, thus making unnecessary the use of separate machinery to mix the dust.

Having described my invention, I claim:

1. An air cleaner comprising: a dust hopper; a vertically arranged filter tube with its lower end connected to said hopper, said tube receiving incoming gas internally, filtering that gas as it passes radially outward through the tube wall and discharging the filtered dust axially downward into the hopper at a predetermined static pressure; and a vertically arranged cyclone dust separator having a tangential inlet to receive incoming gas disposed above said tube, an upper clean gas outlet discharging into said tube and an elongate conduit depending from its lower end to said hopper and contained within said tube to discharge cyclonically separated dust into said hopper at a static pressure approximating said predetermined static pressure.

2. The cleaner of claim 1 wherein: said separator discharges gas cleaned by it axially into said tube; and said elongate conduit extends coaxially downward through said tube.

3. An air cleaner comprising: an upper gas inlet header; a lower dust hopper; a filter tube vertically arranged between header and hopper to receive dust and gas axially, filter that gas as it passes radially outward through the tube into the surrounding atmosphere and ultimately discharge the separated dust axially into the hopper; and a cyclone separator positioned with its upper end within the header and with its lower end extending downwardly into said tube, said separator having a tangentially directed inlet opening disposed within said header for receiving gas, an upper axial outlet connected to discharge relatively clean gas axially into said tube and an elongate conduit depending from its lower end axially downward through the tube to discharge dust into the dust hopper, said separator and its elongate conduit being designed to discharge dust into the hopper at a static pressure approximating that existing at the lower end of said filter tube.

4. An air cleaner comprising a dust hopper, a tube of permeable filter medium disposed substantially perpendicular to said hopper and having its lower end disposed in gaseous communication therewith, said tube arranged to filter gas as it passes radially outward through the tube wall and to discharge filtered solids axially downward into said hopper at a predetermined static pressure, a cyclonic dust separator having a tangential inlet to receive incoming gas disposed above said tube, a clean gas outlet disposed in gaseous communication with the interior of said tube, and dependent baffle means havng a dust discharging opening therein disposed within said tube and an elongate conduit member disposed within said tube having one end surrounding the dust discharging opening in said baffle means and the other end communicating with said hopper for discharging dust passing through said opening therein at a static pressure approximating said predetermined static pressure.

5. An air cleaner comprising a dust hopper, a tube of permeable filter medium disposed substantially perpendicular to said hopper and having its lower end disposed in gaseous communication therewith, said tube arranged to filter gas as it passes radially outward through the tube wall and to discharge filtered solids downward into said hopper at a predetermined static pressure, cyclonic dust separation means having a tangentially disposed gas introduction inlet disposed above said tube, a clean gas outlet disposed in gaseous communication with the interior of said tube and a reduced diameter dust discharging opening disposed within the upper end of said tube and an elongate conduit member disposed within said tube having one end surrounding the dust discharging opening in said cyclonic dust separation means and the other end communicating with said hopper for discharging dust therein at a static pressure approximating said predetermined static pressure.

References Cited in the file of this patent

UNITED STATES PATENTS

| | | |
|---|---|---|
| 883,413 | Mahony | Mar. 31, 1908 |
| 2,276,805 | Tolman | Mar. 17, 1942 |

FOREIGN PATENTS

| | | |
|---|---|---|
| 1,013,102 | France | Apr. 30, 1952 |
| 737,457 | Great Britain | Sept. 28, 1955 |